April 7, 1964 L. D. HARMON 3,128,340

ELECTROGRAPHIC TRANSMITTER

Filed Dec. 21, 1961 2 Sheets-Sheet 1

INVENTOR
L. D. HARMON
BY G. E. Hirsch Jr.
ATTORNEY

April 7, 1964 L. D. HARMON 3,128,340
ELECTROGRAPHIC TRANSMITTER
Filed Dec. 21, 1961 2 Sheets-Sheet 2
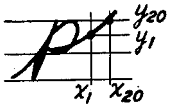
FIG. 3A
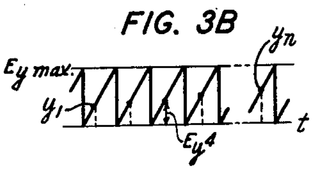
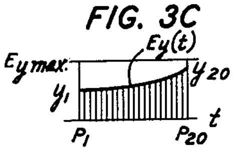
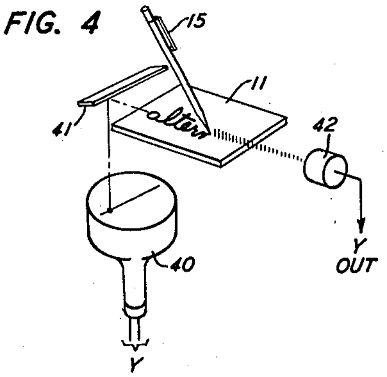
FIG. 5
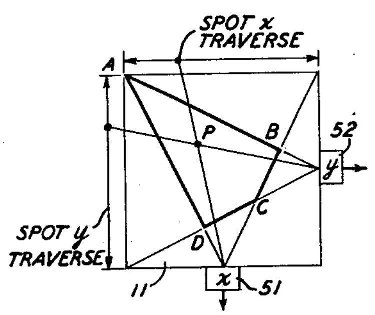
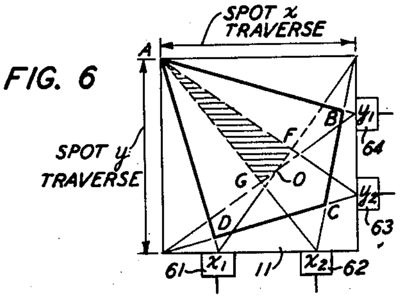
FIG. 7
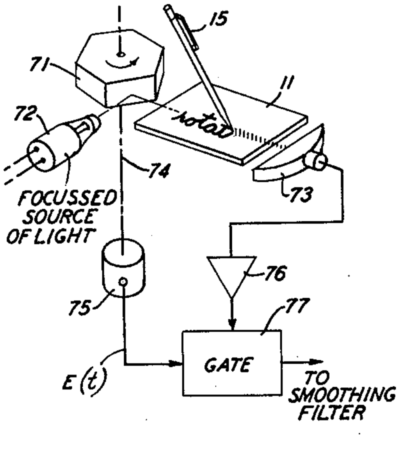
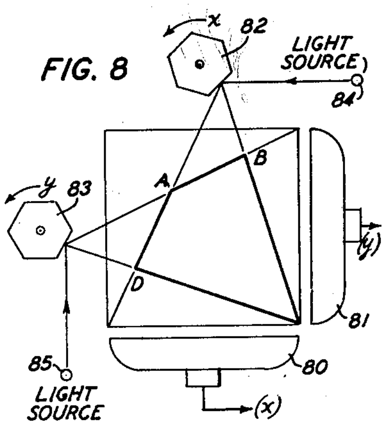
INVENTOR
L. D. HARMON
BY G. E. Hirsch Jr.
ATTORNEY United States Patent Office 3,128,340

Patented Apr. 7, 1964

3,128,340
ELECTROGRAPHIC TRANSMITTER

Leon D. Harmon, Warren Township, Somerset County, N.J., assignor to Bell Telephone Laboratories, Incorporated, New York, N.Y., a corporation of New York Filed Dec. 21, 1961, Ser. No. 161,167
11 Claims. (Cl. 178—18)

This invention relates to the conversion of graphic material into electrical signals. More particularly, it relates to an electrographic signal generator for instantaneously converting cursive writing or the like produced by a stylus operating on a surface of the generator into electrical signals. It has for its principal objects the production of an electrical signal representing the location of the stylus at any instant, the avoidance of all encumbrances, either electrical or mechanical, of the stylus used with the generator, and the simultaneous procurement of a permanent record of the graphic material as it is written.

A great variety of electrographic transducers, known variously as telewriter generators and telautographic transmitters, are available for converting printed or cursive writing, or other graphic material into electrical signals. Apparatus of this sort has been used in the past in terminal equipment of private communication systems and, more recently, to supply electrical signal counterparts of written human language to automatic character or pattern recognition apparatus that converts written human language into what has been termed "machine language." The basic transducer requirements are essentially the same for both applications. Yet in prior art devices, where it has not usually been possible to meet all basic requirements simultaneously, emphasis has shifted in various equipments from a predominant fulfillment of one requirement to an attempt to fulfill one or more of the others.

Perhaps the most important requirement is that the conversion from one form of intelligence to another be a faithful one; one without excessive distortion. Distortion arises not only from the mechanical and electrical intricacies of the apparatus, but also often as a result of the manner by which the writing instrument or stylus is encumbered, as by an electrical conductor coupling it to the apparatus or by rather involved mechanical linkages supporting it, such as pantographs and the like. So long as a captive stylus of any sort is required, the exercise of a natural writing style is hindered and an operator must adapt his writing manner to that of the device. Even if electrical conversion linearity is insured, a captive stylus reduces the faithfulness of the transcription. A stylus free of all restraint clearly is preferable.

A further requirement is that a permanent record be made concurrent with the writing operation. Mechanical telautographs traditionally provide a record, but most free-stylus apparatus does not. Free-stylus devices are known, of course, that use a cathode ray tube face or a resistive sheet as a writing surface; however, only with auxiliary equipment can a permanent record be made with them.

These requirements are met in an electrographic transmitter described and claimed in my patent application Serial No. 72,605, November 30, 1960, now U.S. Patent No. 3,016,421, by which a faithful translation is made from graphic to electrical form. The transmitter described therein comprises in essence a writing surface suitable for supporting a sheet of ordinary writing paper, above which a flat focused sheet of light is directed in at least two non-parallel directions over the surface. A plurality of photosensitive elements is positioned along the edges of the writing surface to capture the focused light. Individual photocell elements are coupled by means of suitable amplifiers to output registers. As the light sheet is interrupted by the shadow of any form of opaque stylus point, used for entering the writing material on the writing surface, signals are produced in the shadowed photocell circuits. Pairs of such signals specify the instantaneous quantized X—Y address of the stylus tip on the writing surface. These data, which represent unique indicia of the coordinates of position of the stylus, are supplied to the registers and held until ingested by suitable utilization apparatus. However, with a multiple array of photocells, spatial resolution of the quantized signals can be no better than the limitations imposed by the number, size, and spacing of the individual cells in the arrays. Thus, a degree of granularity, i.e., quantizing error, is present in the output address signals.

The present invention avoids this difficulty to a considerable extent and makes extremely fine spatial resolution feasible. In contrast to the discrete spatial relationship used herefore, a continuous spatial relationship between the light source and photosensitive element is employed in the electrographic transmitter of the present invention. The continuous spatial relationship is attained in the present invention by the employment of moving sources of illumination, emanating from at least two edges of a writing surface, which are played across the surface at grazing incidence. Preferably, well defined beams of light are cyclically swept across the surface in a plane substantially parallel to and slightly above the surface from at least two distinct sites of origin. A photocell positioned at each edge of the surface opposite one of the sites of origin senses one of the sweeping beams throughout its entire cycle and detects interruptions of illumination as the stylus intervenes. With two sources of moving light and with two corresponding photocells, arranged orthogonally for example, localization is sufficient to provide a unique representation of stylus position in two coordinate directions.

The sweeping light beams may be produced in various ways. For example, a flying spot scanner juxtaposed to each of two edges of the writing area may be used or, alternatively, a discrete beam of light may be swept across the writing surface from two sources, for example, by means of a rotating or oscillating mirror or prism arrangement. With the flying spot source, an apertured photocell is positioned at the opposite edge of the writing area to capture the light spot and its stylus-interrupted shadows. For any stylus position, within certain prescribed limits, and for a pre-established beam position, there is but one straight line that joins the momentary beam site of origin (spot position), the stylus, and the photocell. At this instant in the beam cycle, light that would otherwise strike the photocell is interrupted, and a shadow signal is developed. If the sweep cycle parameters are known, the stylus position is completely specified. With the fixed beam of light and the oscillating mirror arrangement, an integrating photoreceiver is used, i.e., a single photosensitive device adapted to sense incident light along the entire edge of the writing surface. A suitable prism, lens, diffusing screen, or the like, placed in front of a photocell is satisfactory. Stylus position is identified by that point in the mirror oscillation cycle at which shadowing of the corresponding photocell is detected.

The moving spot is made to move repetitively in a straight line parallel to the writing surface. Its repetition rate may be any convenient one so long that it is fast enough to freeze stylus motion to within a desired degree of accuracy. Typically, real-time handwriting can be represented by a very narrow bandwidth signal, e.g., 12 c.p.s.; its absolute velocity is seldom more than a few inches per second. Consequently, a sensing beam which moves at a few inches per millisecond allows for no more than a few thousands of an inch stylus position error. The writing trace may thus be said to be oversampled; provision is thereby made for an effectively continuous representation of stylus motion. It is necessary to actuate the stylus position sensing system only when meaningful stylus motion occurs, i.e., when the stylus is in contact with the writing surface and not as it is moved to or from the writing area. By positioning both illumination source and photoreceiver aperture close to the writing surface, adequate discrimination of stylus vertical position is obtained, and thus position indicating signals are developed essentially only when the stylus is in contact with the writing surface. Alternatively, stylus contact may be sensed by any of the techniques described in my previously identified patent application.

It is thus in accordance with the present invention to represent the instantaneous stylus position by essentially continuous variables rather than by quantized locations. Yet, the numerous advantages of the previously described system are preserved, namely, a pen or pencil may be used without restraint as a stylus to create a permanent written record or ordinary writing paper concurrent with the conversion of stylus motions into electrical signals proportional to the instantaneous coordinates of stylus position. Furthermore, the writing surface is clear of electromechanical guide elements and the like, and is insensitive to electrostatic and electromagnetic influences that often disturb telewriters that rely on electric and magnetic fields.

The invention will be fully apprehended from the following detailed description of illustrative embodiments thereof taken in connection with the appended drawings, in which.

Figure 2:
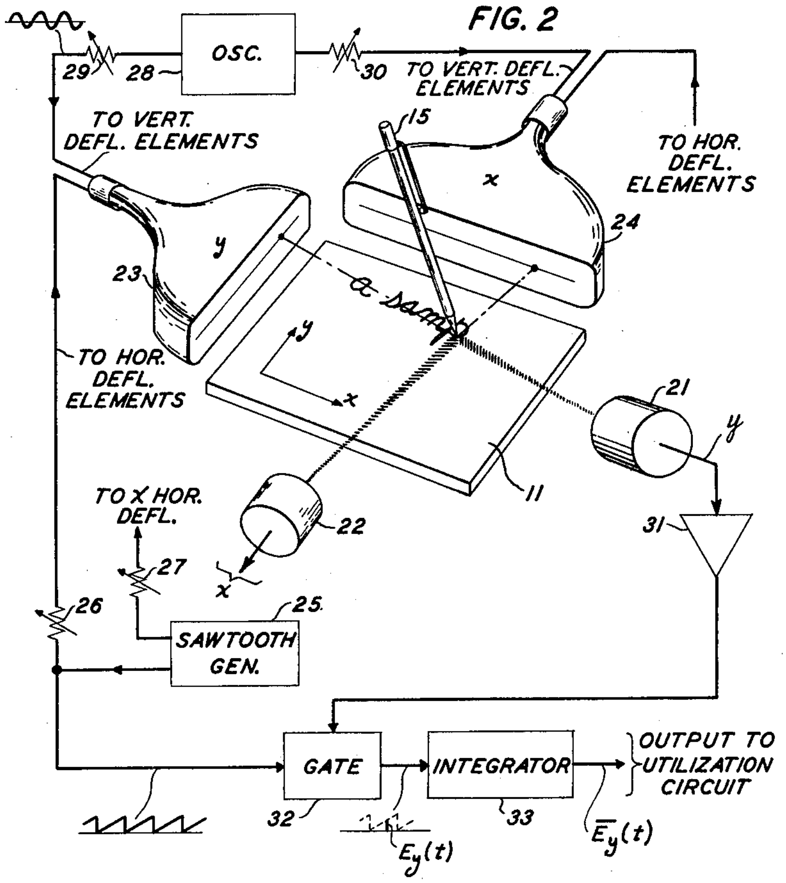
FIG. 2 is a perspective view of an electrographic transmitter that illustrates the principles of the invention in one of its forms.

FIGS. 3A, 3B, and 3C illustrate the manner by which stylus position is determined in the apparatus of FIG. 2;

FIG. 4 is a simplified perspective view of an alternative form of optical system for use in the practice of the invention;

FIG. 5 illustrates the field of view available for writing in an electrographic transmitter employing a single photocell at each of two orthogonal edges;

FIG. 6 illustrates the field of view available for writing in an electrographic transmitter employing two photocells at each of two orthogonal edges;

FIG. 7 is a simplified perspective view of an alternative form of optical system employing a fixed source of illumination and a moving mirror arrangement according to the invention; and FIG. 8 illustrates the field of view available for writing in an electrograph transmitter employing a rotating mirror source of sweeping illumination and an integrating photocell in each of two orthogonal directions.

Figure 1:
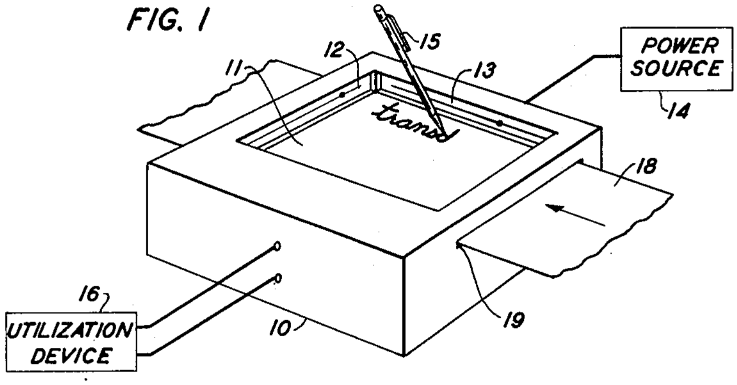
FIG. 1 is a simplified diagrammatic representation of an electrographic transmitter in accordance with the present invention.

Referring now to FIG. 1, there is shown an electrographic signal generator which includes a base member 10 which supports a writing surface 11. The writing surface is ordinarily located in a recessed area so the optical system of the transducer may be fully encased. The optical system, mounted within the case at the edges of the writing area, includes apparatus for directing a sweeping beam of light from the edges of the writing surface across it, preferably in the form of a beam moving in a plane substantially parallel to and in close proximity to the writing surface. The beams from each of two signal sources, 12 and 13, at the edges of the writing surface impinge upon photosensitive devices positioned along the opposing edges of the surface in the path of the sweeping beams. Although not evident in FIG. 1, the photosensitive devices are positioned within base 10 at the edges of the writing surface opposite the light sources 12 and 13. Electric power for energizing the light sources and the like is supplied to the transducer from source 14.

An ordinary pen or pencil 15 is used to write on the surface 11, which may, if desired, be covered by a sheet of writing paper as shown in FIG. 1. Any guide line restrictions required by the manner in which derived signal information is to be used must, of course, be observed. Such restrictions, the nature of the guide lines, and suitable means for producing them, are fully described in my previously identified patent application. It will be recognized that the absolute freedom of all electrical and mechanical restraints of the writing instrument permits a natural writing style to be exercised. As the stylus is used to write on the surface, interruptions of the sweeping light beam in each of two coordinate directions are detected by the photocells positioned at the respective opposite edges of the surface. If the sweeping spot of light moves repetitively at a sufficiently high rate, e.g., one kilocycle per second, consecutive shadowing of the photocells provides sufficient information to yield a substantially continuous indication of the precise stylus point on the surface as it moves. The amplified shadow signal may thus be used to gate a ramp signal synchronized with the sawtooth signal used to deflect the sweeping spot of light, or it may gate the sawtooth deflection voltage directly, to provide a representation of the instantaneous beam position. This in turn is a sufficient specification of the instantaneous stylus position. Successive interruptions may be integrated, i.e., smoothed, to obtain a continuous representation of stylus position. The continuous X—Y signals are supplied to utilization device 16, which may typically include processing equipment for adapting the signals for use in automatic character recognition apparatus or other computer applications.

If a permanent record of the writing entered on the surface is desired, ordinary writing paper may be placed on the surface. Conveniently, a sheet of paper 18 is drawn from a roll or the like and passed through a slot 19, that extends through the base 10, to cover the writing area. Once a message is complete the paper is pulled through the slot to renew the writing surface; the used portion may be preserved as a permanent record.

FIG. 2 illustrates, by way of a simplified schematic view, elements of a preferred form of electrographic transducer that embodies the principles of the invention. Two apertured photocells 21 and 22 are respectively positioned along two coordinate edges of the writing area 11. Any form of photosensitive device may be used so long as its sensitive area is restricted suitably, as by an opaque mask with a small aperture placed in front of the area, to insure that incident light is accepted only from a limited field of view. A sweeping beam of light is played across the surface 11 toward photosensitive devices 21 and 22 from light sources 23 and 24 positioned along the opposite coordinate edges of the surface. Typically, cathode ray tubes may be used as the light sources, each with a single deflection path or trace being utilized and oriented to be substantially parallel to and just above the writing surface 11. Shadows resulting from random room illumination falling on the stylus are ordinarily not sufficiently deep nor properly directed to overcome the biasing effect of the flying spot traces. Deflection signals for the cathode ray tubes are obtained from sawtooth generator 25, which supplies deflection potentials by way of attenuators 26 and 27, respectively, to the horizontal deflection elements of tubes 23 and 24. Should it be desired to increase the effective beam brightness, the flying spot is wobbled by deflecting it slightly at right angles to its normal direction of traverse. This is accomplished by introducing a small vertical deflection voltage, originating in oscillator 28 and passed by way of attenuators 29 and 30, respectively, to the vertical deflection elements of tubes 23 and 24. A sine wave at a frequency of one hundred kilocycles has been found adequate for this purpose.

As writing takes place on the surface 11, the photosensitive cells are shadowed once during each cycle of deflection to produce an output signal indicative of the momentary position of the stylus. One suitable circuit for processing Y channel information is shown by way of illustration; a second and identical channel is, of course, provided for X channel information. The amplified shadow signal derived from photosensitive device 21 is passed by way of amplifier 31 to gate circuit 32 where it is used to momentarily gate the sawtooth deflection wave supplied from generator 25 to an integrator circuit 33. In effect, the sawtooth deflection voltage is sampled at a point in the sweep cycle which represents the instantaneous beam position at the time of shadowing, and hence, stylus position in the Y coordinate direction. If $E_{ymax}$ denotes the peak amplitude of the sawtooth voltage, then $E_y(t)$ represents the instantaneous voltage sensed for the relative position $t$. With each successive cycle of sawtooth deflection, a new voltage $E_y(t)$ is sensed and supplied to integrator 33. Integration with a suitable time constant yields a smoothed continuous representation $\overline{E}_y(t)$ which is proportional to the continuous movement in time of the stylus. Integrator 33 may take any desired form and may, in practice, be a simple low-pass filter of any sort well known in the art.

An example of the development of a continuous output signal $\overline{E}_y(t)$ is shown in FIG. 3. In FIG. 3A stylus movement for a portion of the script letter $p$ is indicated as occurring between points $P(x_1,y_1)$ and $P(x_{20},y_{20})$. Stylus motion for this interval generally spans many successive beam sweep periods, twenty such motions are indicated simply by way of example. The operation of the gate deflection voltage circuit is indicated in FIG. 3B wherein five periods of the sawtooth deflection waveform are shown. Once during each period a sampled voltage $E_y(t)$ is developed through the action of the shadowing signal applied to the gating circuit. The fourth such sample $E_y(4)$ is indicated. In FIG. 3C the sequence of twenty samples is shown together with their integrated representation $\overline{E}_y(t)$. It will be noted that this is a continuous voltage proportional to the stylus position in the Y direction between the points one and twenty.

A similar gating and integrating arrangement is utilized to produce $\overline{E}_x(t)$. The two voltages together provide a sufficiently complete representation of stylus motion to actuate remote display reproduction or analysis apparatus.

An alternative arrangement for directing a cathode ray tube trace across the writing surface 11 is shown in FIG. 4. In some applications it is more convenient to place a cathode ray device below the writing surface than to position it in a plane substantially parallel to it. Accordingly, the illuminated trace from cathode ray device 40 may be directed across the surface 11 by way of a front surfaced mirror 41 placed at a suitable angle, e.g., 45 degrees for the arrangement illustrated, to direct the moving beam of light toward apertured photosensitive device 42. As before, a second light source and mirror arrangement are positioned along the orthogonally displaced edge of the writing surface and directed to a second photosensitive device to yield a complete specification of the momentary position of stylus 15.

FIG. 5 illustrates the geometrical relationships of the flying spot, the photocells, and the writing surface for either the arrangement of FIG. 2 or FIG. 4. Writing surface 11 is indicated with arrows along the top and left-hand edges to denote the respective spot paths. The effective coverage of the writing area in the Y direction is defined by the fan shaped pair of lines of which AB and DC are segments. Similarly, for the X direction the effective beam boundaries are defined by the segments AD and BC. The area of overlap, defined by the trapezium ABCD, constitutes the spaces within which both X and Y coordinate information are obtainable. It should be noted that the various coordinate lines are neither parallel nor orthogonal. The skew coordinate system is, however, a simple projective transformation of a conventional Cartesian rectilinear coordinate system, and each intersection of a pair of coordinate lines is unique. An opaque stylus at point P generates a shadow signal in photoelectric cells 51$(x)$ and 52$(y)$ when the $x$ and $y$ spots are in the indicated positions. The $x$ and $y$ sweeps may, but need not necessarily be, synchronized since the sweep rates are extremely rapid compared to the rate of stylus motion.

An improvement in the efficiency of utilization of writing spaces is illustrated in FIG. 6. If two photocells 61, 62$(x)$ and 63, 64$(y)$, respectively, are used for intercepting X and Y trace information, the useful boundary ABCD is considerably enlarged. For the configurations shown in FIGS. 5 and 6, the useful areas are, respectively, 26 percent and 45 percent of a square writing surface 11. The alternative arrangement of FIG. 6 can be used in several different ways. The shaded area AFOG represents that part of the useful surface from which signal information may be directed to both pairs of photocells $x_1$, $x_2$ and $y_1$, $y_2$. Two different signals per coordinate for each sweep cycle are furnished from this area and thus provide a redundancy check, or noise combating feature. The increased useful area ABCD may be used by sensing the outputs from each of the four different cells and by suitably gating them into utilization circuits by conventional means.

A somewhat different arrangement for producing a swept beam over a writing surface is illustrated in FIG. 7. A motor-driven mirrored surface 71 is used to sweep a fixed-source beam of light, originating, for example, in source 72, across the writing area 11. As the beam reaches the opposite edge of the writing area in each coordinate direction, an integrating photosensitive element 73 is actuated. In essence, photosensitive element 73 comprises a single photocell adapted to intercept light in the beam at any time or position of its traverse. It may include a plurality of photocells spaced along the edge of the writing platform and connected in parallel, or preferably, a single photocell coupled to the writing surface by a lens or prism or a diffusing surface to accept light from a relatively wide span and to direct it to a single point. As the beam makes a full traverse, the photocell produces a continuous signal. If, however, stylus 15 is positioned anywhere within the scanned area, an interruption or shadow signal is produced by the cell. Such a signal is uniquely related to a particular position of the mirror rotating drive shaft 74. Accordingly, transducer 75, coupled to the drive shaft 74, is used to develop a voltage $E_y(t)$ whose magnitude is representative of the momentary shaft position. Shadow signals from photocell 73 are then passed by way of amplifier 76 and used to gate the transducer voltage $E_y(t)$ through gate 77. The sequence of pulses, of varying amplitudes, passed through the gate provides a unique indication of stylus position. As described above, the sequence of pulses may be smoothed to yield a continuous output signal.

The moving reflector 71 may take any form well known in the art. Preferably, a multifaceted mirror arrangement, i.e., a mirror drum containing a number of flat, front-surfaced, mirrors are arranged to rotate or oscillate about shaft 74 at a suitable high frequency. With this arrangement, light from source 72 impinging on one of the mirror surfaces is directed in a fan-like path across surface 11. With suitable rotational velocity, consecutive sweeps take place at any convenient rate, for example, at a few hundred sweeps per second. Alternatively, an oscillating mirror, arranged to have a relatively slow sweep in one direction and an appreciably faster return sweep may also be used. Shaft position indicator 75 may be any one of a number of well known transducers, for example, a variable capacitance or inductance sensing device arranged to convert angular position to electrical voltage representations.

The useful scanned area for this system is illustrated in FIG. 8. Here ABCD represents the bounded domain in which writing may take place.

The above-described arrangements are, of course, merely illustrative of the application of the principles of the invention. Numerous other arrangements may be devised by those skilled in the art without departing from the spirit and scope of the invention.

What is claimed is:

1. An electrographic transmitter that comprises a writing surface, means for effectively sweeping a beam of light over said surface in a plane substantially parallel to and a small distance above said surface, a photosensitive element positioned to capture the light of said beam throughout its entire sweep over said writing surface, and means for identifying that instant in the sweep of said beam at which said photosensitive element is shadowed by an opaque object.

2. An electrographic transmitter that comprises a writing surface, means for cyclically sweeping discrete beams of light from at least two different sites of origin over said surface in a plane substantially parallel to and a small distance above said surface, at least two photosensitive elements, each arranged to capture the light of one of said beams throughout its entire sweep over said writing surface, and means responsive to interruptions in the signals which are produced by each of said photosensitive elements, occasioned by interpositions in said beam paths by an opaque object, for identifying the instantaneous position of said opaque object on said surface.

3. Electrographic transmitter apparatus that comprises a writing surface, means for cyclically sweeping a beam of light along and a small distance above one edge of said surface, an apertured photosensitive element positioned at a point contiguous to but just above an opposite one of the edges of said surface for observing said beam throughout its entire traverse of said surface edge, and means for relating discontinuities in signals produced by said photosensitive element to shadowing of said beam by an opaque object.

4. Apparatus as defined in claim 3 wherein said means for cyclically sweeping a beam of light along one edge of said surface includes a cathode ray tube juxtaposed to said surface and adjusted so that its unidirectional trace appears effectively to travel along the edge of said surface, and wherein said apertured photosensitive element comprises a photocell and an apertured mask for shielding said photocell from all incident light except that passing through said aperture.

5. Electrographic transmitter apparatus that comprises a writing surface, means for cyclically sweeping a beam of light emanating from a situs juxtaposed one edge of said writing surface through a fan-like sector in a plane substantially parallel to and a small distance above said surface, a photosensitive surface at the edge of said writing surface opposite said situs responsive to incident light along said opposite edge of said writing surface, and means for relating discontinuities in signals produced by said photosensitive surface to shadowing of said beam by an opaque object.

6. Apparatus as defined in claim 5 wherein said means for cyclically sweeping a beam through a sector above said surface comprises a source of a pencil beam of light, a mechanically operated moving mirror juxtaposed one edge of said writing surface for playing said pencil beam across said surface at grazing incidence, and wherein said photosensitive surface comprises a photocell and optical means contiguous with said opposite edge for directing incident radiation to said photocell.

7. Electrographic transmitter apparatus that comprises a writing surface, means for generating a periodic deflecting potential, means responsive to said deflecting potential for effectively sweeping discrete beams of light along at least two different edges of said surface at a small distance above said surface, a photosensitive element for respectively observing light from each one of said beams after passage over said writing surface, and means for relating interruptions in signals produced by said photosensitive elements to that portion of the sweep cycle of each of said beams at which light in said beam is shadowed by an opaque object.

8. Apparatus as defined in claim 7 wherein said means for relating signal interruptions to sweep cycle portions comprises means responsive to interruptions in signals produced by each of said photocells for independently actuating gating means supplied with said periodic deflection potentials, and means for smoothing said gated signals to form essentially continuous electrical representations of the position of said opaque object on said surface.

9. Apparatus as defined in claim 7 in combination means for increasing the effective brightness of each of said beams, said means comprising means for wobbling said beams at a relatively high frequency in a direction substantially normal to the primary direction of traverse of said beams.

10. Electrographic transmitter apparatus that comprises a writing surface, a source of a beam of light, a reflecting surface pivotally mounted in juxtaposition to one edge of said writing surface, means for cyclically moving said reflecting surface to direct said pencil beam of light through an arc in a plane substantially parallel to and a small distance above said surface, photosensitive means responsive to light from said beam reaching any point along another edge of said surface, and means for relating interruptions in signals produced by said photosensitive means to the shadowing of said beams from said photocell by an opaque object.

11. Apparatus as defined in claim 10 wherein said means for relating photocell signal interruptions to shadowing of said beam comprises means for generating a signal proportional to the momentary position of said pivotally mounted reflecting surface, and means for measuring said position indicating signal each time a signal interruption is detected in said photocell circuit.

References Cited in the file of this patent

"Electronic and Radio Engineering," by F. E. Terman, 4th edition, 1955, McGraw-Hill Book Co., pages 1004–1005.